US009136519B2

(12) United States Patent
Moon (10) Patent No.: US 9,136,519 B2
(45) Date of Patent: Sep. 15, 2015

(54) CAP ASSEMBLY AND BATTERY PACK HAVING THE SAME

(71) Applicant: SAMSUNG SDI CO., LTD., Yongin-si, Gyeonggi-do (KR)

(72) Inventor: Dae-Yon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 231 days.

(21) Appl. No.: 13/689,616

(22) Filed: Nov. 29, 2012

(65) Prior Publication Data

US 2014/0072857 A1  Mar. 13, 2014

(30) Foreign Application Priority Data

Sep. 10, 2012 (KR) .................. 10-2012-0100140

(51) Int. Cl.
*H01M 2/34* (2006.01)
*H01M 2/20* (2006.01)
*H01M 2/04* (2006.01)
*H01M 2/30* (2006.01)
*H01M 2/32* (2006.01)
*H01M 2/02* (2006.01)

(52) U.S. Cl.
CPC ............. *H01M 2/202* (2013.01); *H01M 2/043* (2013.01); *H01M 2/206* (2013.01); *H01M 2/305* (2013.01); *H01M 2/32* (2013.01); *H01M 2/02* (2013.01); *H01M 2/021* (2013.01); *H01M 2/34* (2013.01); *H01M 2200/00* (2013.01); *H01M 2200/10* (2013.01); *H01M 2200/106* (2013.01); *H01M 2220/20* (2013.01)

(58) Field of Classification Search
None
See application file for complete search history.

(56) References Cited

U.S. PATENT DOCUMENTS

| 6,335,110 | B1* | 1/2002 | Chang et al. ........... 429/7 |
| 2010/0081015 | A1* | 4/2010 | Kim et al. .............. 429/7 |
| 2011/0070466 | A1* | 3/2011 | Park et al. .............. 429/7 |
| 2011/0129708 | A1* | 6/2011 | Doo ...................... 429/94 |
| 2012/0058390 | A1* | 3/2012 | Obayashi et al. ......... 429/179 |

FOREIGN PATENT DOCUMENTS

| JP | 2002-343315 | 11/2002 |
| KR | 10-2002-0086228 A | 11/2002 |
| KR | 10-2007-0081306 A | 8/2007 |
| KR | 10-2008-0038662 A | 5/2008 |
| KR | 10-2008-0039090 A | 5/2008 |
| KR | 10-2012-0024503 A | 3/2012 |

OTHER PUBLICATIONS

KIPO Registration Determination Certificate dated Jul. 31, 2013 for KR 10-2012-0100140, 6 pgs.

* cited by examiner

*Primary Examiner* — Jeremiah Smith
(74) *Attorney, Agent, or Firm* — Christie, Parker & Hale, LLP (57) ABSTRACT

A cap assembly and a battery pack having the same. The cap assembly includes: a cap plate including: a first surface; and a second surface opposite to the first surface, wherein a first hole penetrates through the cap plate from the first surface to the second surface; a first electrode terminal including: an upper terminal on the first surface of the cap plate; a lower terminal on the second surface of the cap plate; and a connection part that connects the upper terminal to the lower terminal through the first hole; a temperature protection device on an upper surface of the upper terminal; and an insulation part interposed between the cap plate and the first electrode terminal and including a first groove. Here, the upper terminal and the temperature protection device are in the first groove.

15 Claims, 6 Drawing Sheets

CAP ASSEMBLY AND BATTERY PACK HAVING THE SAME

CROSS-REFERENCE TO RELATED APPLICATION

This application claims priority to and the benefit of Korean Patent Application No. 10-2012-0100140, filed on Sep. 10, 2012, in the Korean Intellectual Property Office, the disclosure of which is incorporated herein in its entirety by reference.

BACKGROUND

1. Field

One or more embodiments of the present invention relate to a cap assembly and a battery pack having the same.

2. Description of the Related Art

A secondary battery is a rechargeable battery that is used in various applications, for example, as an energy source for mobile electronic devices (such as digital cameras, cellular phones, and laptop computers) or an energy source for hybrid electric vehicles and the like.

Additionally, accompanying an increase in the use of secondary batteries are demands for higher power and higher capacity secondary batteries and demands for slimmer and more stable secondary batteries. However, an increase of these various demands may also cause an increase in spatial limitations for installing parts, thereby resulting in an increase in manufacturing costs.

SUMMARY

Aspects of one or more embodiments of the present invention include a cap assembly in which a temperature protection device is formed as one body, and a battery pack having the same.

Additional aspects may become apparent from the description, or may be learned by practice of the presented embodiments.

According to one or more embodiments of the present invention, a cap assembly includes: a cap plate including: a first surface; and a second surface opposite to the first surface, wherein a first hole penetrates through the cap plate from the first surface to the second surface; a first electrode terminal including: an upper terminal on the first surface of the cap plate; a lower terminal on the second surface of the cap plate; and a connection part that connects the upper terminal to the lower terminal through the first hole; a temperature protection device on an upper surface of the upper terminal; and an insulation part interposed between the cap plate and the first electrode terminal and including a first groove. Here, the upper terminal and the temperature protection device are in the first groove.

An area of each of the upper terminal and the lower terminal may be greater than a horizontal cross-sectional area of the first hole.

The insulation part may include a first fixing part on the second surface of the cap plate, the first fixing part may include a second groove, and the lower terminal may be in the second groove.

The insulation part may include an extension part extending along the first surface of the cap plate in a longitudinal direction of the cap plate.

The cap plate may have a second hole separate from the first hole, the insulation part may include a second fixing part on the second surface, the second fixing part may be spaced apart from the first fixing part, and the second fixing part and the extension part may be continuously formed through the second hole.

According to one or more embodiments of the present invention, a lead tap is connected to an upper surface of the temperature protection device. The lead tap may extend along an upper surface of the extension part. A metal layer of a material different from the lead tap may be interposed between the temperature protection device and the lead tap.

A plurality of third holes may be in the insulation part between the cap plate and the upper terminal.

Aspects of embodiments of the present invention provide for a battery pack including: a can having an opening; an electrode assembly inside the can; and a cap assembly closing the opening, wherein the cap assembly includes: a cap plate including: a first surface; and a second surface opposite to the first surface, wherein and a first hole penetrates through the cap plate from the first surface to the second surface; a first electrode terminal including: an upper terminal on the first surface of the cap plate; a lower terminal on the second surface of the cap plate; and a connection part that connects the upper terminal to the lower terminal through the first hole; a temperature protection device on an upper surface of the upper terminal; and an insulation part interposed between the cap plate and the first electrode terminal and including a first groove. Here, the upper terminal and the temperature protection device are in the first groove.

The second surface of the cap plate may face towards the inside of the can.

The insulation part may include a first fixing part on the second surface of the cap plate, the first fixing part may include a second groove, and the lower terminal may be in the second groove.

The insulation part may include an extension part extending along the first surface of the cap plate in a longitudinal direction of the cap plate.

The cap plate may have a second hole separate from the first hole, the insulation part may include a second fixing part on the second surface, the second fixing part may be spaced apart from the first fixing part, and the second fixing part and the extension part may be continuously formed through the second hole.

A mounting groove, on which the insulation part is mounted, may be in the first surface of the cap plate.

According to one or more embodiments of the present invention, a lead tap is connected to an upper surface of the temperature protection device and extends along the upper surface of the extension part. A metal layer of a material different from the lead tap may be interposed between the temperature protection device and the lead tap.

A plurality of third holes may be in the insulation part between the cap plate and the upper terminal.

The electrode assembly may include an anode tap and a cathode tap, and the anode tap may be electrically connected to the cap plate, and the cathode tap may be electrically connected to the lower terminal.

An insulation plate may be interposed between the electrode assembly and the cap assembly.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Aspects of the present invention will now be described more fully with reference to the accompanying drawings, in which exemplary embodiments of the present invention are shown. The present invention may, however, be embodied in many different forms and should not be construed as being limited to the embodiments set forth herein; rather, these embodiments are provided so that this disclosure will be thorough and complete and will fully convey the concept of the present invention to those of ordinary skill in the art. The present invention is defined by the scope of claims and their equivalents.

The terminology used in the application is used only to describe specific embodiments and is not intended to limit the inventive concept. In the specification, an expression in the singular includes an expression in the plural unless they are clearly different from each other in the context. It will be further understood that the terms "comprises" and/or "comprising," when used in this specification, specify the presence of stated components, steps, operations, and/or devices, but do not preclude the presence or addition of one or more other components, steps, operations, and/or devices thereof. Though terms like "first" and "second" are used to describe various elements, the elements are not limited to these terms. These terms are used only to differentiate an element from another element. In addition, when an element is referred to as being "coupled" (e.g., electrically coupled or connected) to another element, it may be directly coupled to the another element or be indirectly coupled to the another element with one or more intervening elements interposed therebetween.

Figure 1:
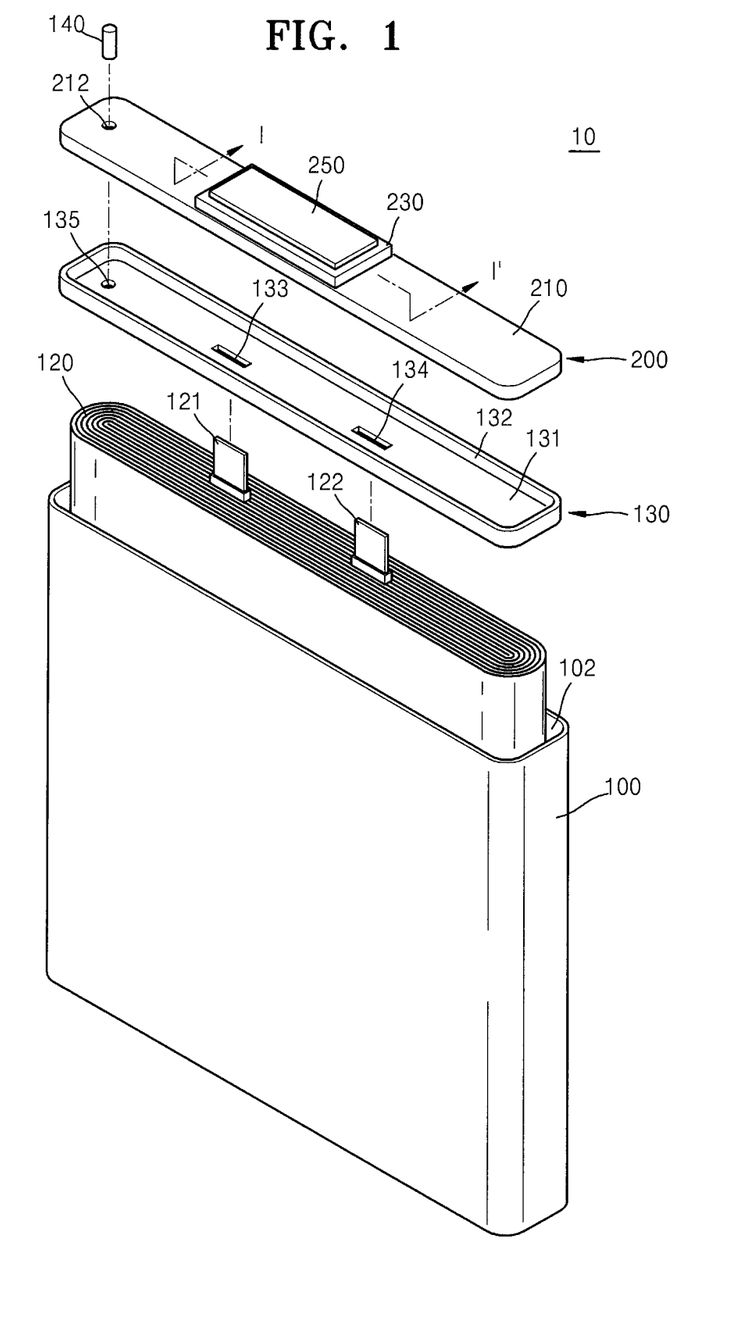
FIG. 1 is an exploded perspective view of a battery pack according to an embodiment of the present invention.
Figure 2:
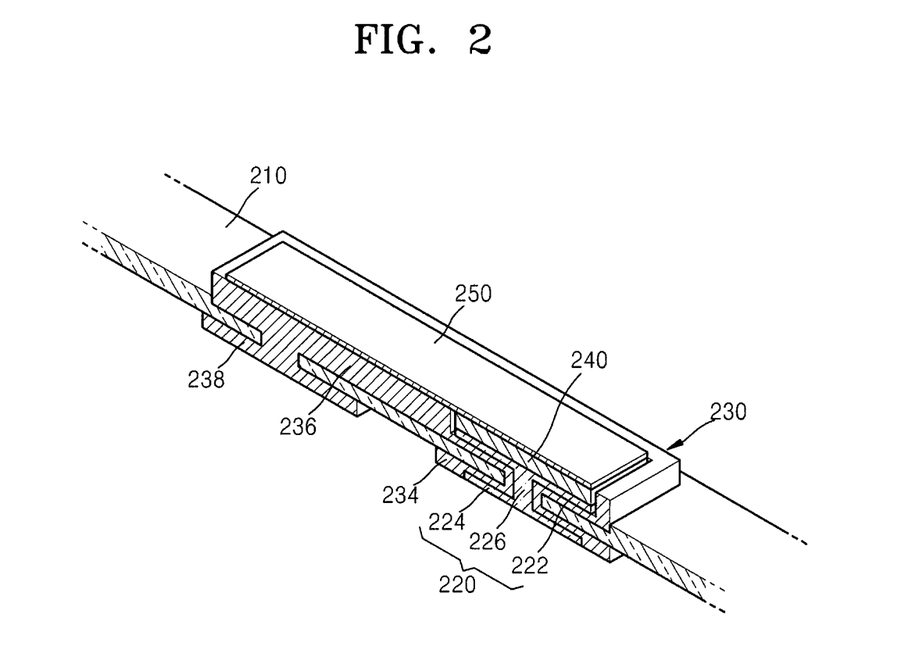
FIG. 2 is a cross-sectional view through the line I-I' of FIG. 1.
Figure 3:
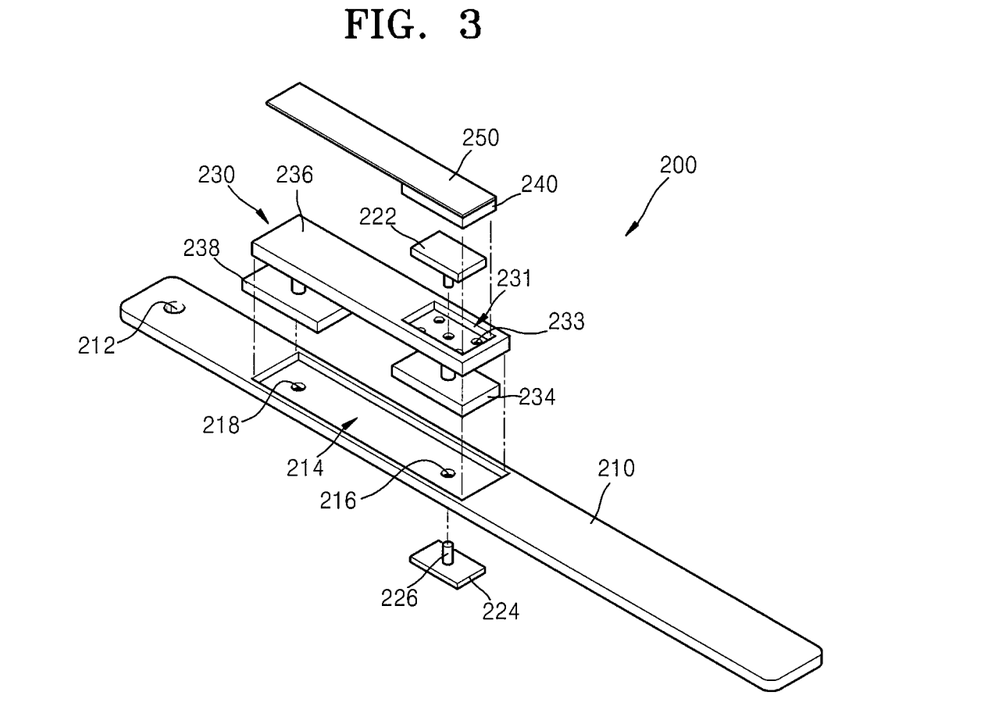
FIG. 3 is an exploded perspective view of a cap assembly of the battery pack of FIG. 1.

FIG. 1 is an exploded perspective view of a battery pack 10 according to an embodiment of the present invention, FIG. 2 is a cross-sectional view through the line I-I' of FIG. 1, and FIG. 3 is an exploded perspective view of a cap assembly 200 of the battery pack 10 of FIG. 1.

Referring to FIGS. 1 to 3, the battery pack 10 according to one embodiment includes a can 100, an electrode assembly 120 located (or accommodated) in the can 100, and the cap assembly 200 assembled with the can 100. In addition, an insulation plate 130 may be interposed between the electrode assembly 120 and the cap assembly 200.

The can 100 includes an opening 102 at an upper part thereof to insert the electrode assembly 120 therein. The can 100 may be formed of a conductive material, such as aluminum (Al), to protect the electrode assembly 120 from an external impact and function as a heat radiation plate for radiating heat, which may accompany a charging and discharging operation, to the outside of the can 100.

The electrode assembly 120 may include a cathode plate and an anode plate on which an electrode active material is coated, and a separator interposed between the cathode and anode plates. For example, the electrode assembly 120 may be produced in a jelly roll form by forming a laminated body in which the cathode plate, the separator, and the anode plate are sequentially layered, and then rolling the laminated body. As another example, although not shown, the electrode assembly 120 may have a structure formed by sequentially layering the cathode plate, the separator, and the anode plate.

The anode plate and the cathode plate may be electrically connected to an anode tap 121 and a cathode tap 122, respectively, to apply electric charges generated by a chemical reaction to the outside.

The electrode assembly 120 may be arranged (or accommodated) inside the can 100 in a state where the electrode assembly 120 is impregnated in an electrolyte (not shown). The opening 102 of the can 100 may be sealed by the cap assembly 200 after the electrode assembly 120 is inserted into the can 100.

The cap assembly 200 may include a cap plate 210, a first electrode terminal 220, a temperature protection device 240 coupled (e.g., connected) to the first electrode terminal 220, and an insulation part 230 for insulating the cap plate 210 from the first electrode terminal 220.

The cap plate 210 may be formed of the same material as the can 100 and may include a first surface facing the outside of the can 100 and a second surface facing the inside of the can 100.

A mounting groove 214 may be formed on the first surface of the cap plate 210. The insulation part 230 may be mounted and fixed on the mounting groove 214, thereby reducing a height of the cap assembly 200.

A first hole (or opening) 216 in (or penetrating) the first and second surfaces may be formed in the cap plate 210 and may be located at the mounting groove 214. The first electrode terminal 220 (described below) is coupled to the first hole 216.

The cap plate 210 may further include a second hole (or opening) 218 that is separate (or apart) from the first hole 216. The second hole 218 may be formed in the mounting groove 214. First and second fixing parts 234 and 238 of the insulation part 230 may be located below the first and second holes 216 and 218, respectively, to firmly fix the insulation part 230 by being formed in one body with the insulation part 230 through the first and second holes 216 and 218.

An electrolyte injection hole 212 may be formed on one side of the cap plate 210. After the cap assembly 200 is assembled with the opening 102 of the can 100, an electrolyte may be injected through the electrolyte injection hole 212, and the electrolyte injection hole 212 may be sealed up by a stopper 140.

The first electrode terminal 220 may include an upper terminal 222, a lower terminal 224, and a connection part 226, which connects the upper terminal 222 to the lower terminal 224 and is inserted into the first hole 216.

The first electrode terminal 220 may be formed of, for example, nickel (Ni), Ni-plated Al, Ni-plated copper (Cu), Ni-plated iron (Fe), or the like, but is not limited thereto.

The upper terminal 222 is arranged on the first surface, and an area (or size) of the upper terminal 222 is greater than a horizontal cross-sectional area of the first hole (or width or size of the first hole) 216, thereby preventing the first electrode terminal 220 from coming out downwards (e.g., toward the opening 102). The lower terminal 224 is arranged on the second surface and has an area greater than the horizontal cross-sectional area of the first hole 216, thereby fixing the first electrode terminal 220 together with the upper terminal 222.

The temperature protection device 240 is (reversibly or alternately) a conductive or an insulating device according to a temperature thereof, and may prevent combustion or explosion of the battery pack 10 due to an overcurrent, overvoltage, overheating, and the like. The temperature protection device 240 may be formed of a polymer positive temperature coefficient (PTC) device in which conductive particles, such as, for example, metal particles or carbon particles, are dispersed into a crystalline polymer, but is not limited thereto.

The temperature protection device 240 is coupled (e.g., connected) to the first electrode terminal 220. In one or more embodiments, the temperature protection device 240 may have a flat stratified (or layered) shape and may be arranged to contact the upper surface of the upper terminal 222. That is, the temperature protection device 240 may be included in a current path which also includes the first electrode terminal 220.

As such, since the temperature protection device 240 is formed in the cap assembly 200 as one body, an additional space for mounting the temperature protection device 240 is not used.

The first electrode terminal 220 is electrically connected to the cathode tap 122 of the electrode assembly 120, and the cap plate 210 (formed of Al or the like) functions as a second electrode terminal by being electrically connected to the anode tap 121 of the electrode assembly 120. Thus, a short between the first electrode terminal 220 and the cap plate 210 may be prevented because the insulation part 230 is interposed between the cap plate 210 and the first electrode terminal 220.

The insulation part 230 may be formed of a plastic material. For example, the insulation part 230 may be formed of polyvinyl chloride (PVC), polystyrene (PS), polypropylene (PP), polyamide (PAM), polycarbonate (PC), polyarylate (PAR), polyimide (PI), or the like, but is not limited thereto.

The insulation part 230 is formed (or arranged) on an inside surface of the first hole 216 to prevent a short between the connection part 226 and the cap plate 210. In addition, the insulation part 230 is formed (or arranged) between the upper terminal 222 and the cap plate 210 and between the lower terminal 224 and the cap plate 210 to prevent a short between the first electrode terminal 220 and the cap plate 210.

A plurality of holes (or openings) 233 may be formed in the insulation part 230 between the upper terminal 222 and the cap plate 210. The holes 233 function to efficiently deliver heat (which may accompany a charging and discharging operation of the electrode assembly 120) to the temperature protection device 240 without being blocked by the insulation part 230. Accordingly, the temperature protection device 240 may sensitively respond to a temperature change, thereby increasing a responding speed of the temperature protection device 240.

According to one or more embodiments of the present invention, a first groove 231 for accommodating (or receiving or disposing) the upper terminal 222 and the temperature protection device 240 is formed in the insulation part 230. Accordingly, the upper terminal 222 and the temperature protection device 240 are mounted in the first groove 231, thereby reducing (or minimizing) a spatial limitation for installing parts. In addition, since the insulation part 230 surrounds the side surfaces of the upper terminal 222 and the temperature protection device 240, a short of the first electrode terminal 220 with another electric conductor may be prevented.

As described above, the insulation part 230 includes the first fixing part 234 formed (or arranged) on the second surface of the cap plate 210. Referring now to FIG. 5B, a second groove 232 for accommodating (or receiving or disposing) the lower terminal 224 is formed in the first fixing part 234. Accordingly, since the insulation part 230 surrounds the side surfaces of the lower terminal 224, a short of the first electrode terminal 220 with another electric conductor may be prevented. In addition, since the insulation part 230 is formed with the first fixing part 234 as one body through the first hole 216, the insulation part 230 may be fixed to the cap plate 210.

In addition, the insulation part 230 includes an extension part 236 extending on the first surface of the cap plate 210 along a longitudinal direction of the cap plate 210, and a second fixing part 238 on the second surface of the cap plate 210 separated from the first fixing part 234. The extension part 236 is located inside the mounting groove 214 formed on the cap plate 210, and the extension part 236 and the second fixing part 238 are continuously formed through the second hole 218. Accordingly, the insulation part 230 may be firmly fixed to the cap plate 210.

Although the single second fixing part 238 separated from the first fixing part 234 is included in the current embodiment, embodiments of the present invention are not limited thereto. For example, the second fixing part 238 may not be formed, the first fixing part 234 and the second fixing part 238 may be formed as one body, or the second fixing part 238 may be formed to include multiple (e.g., three or more) fixing parts.

A lead tap 250 may be attached to the upper surface of the temperature protection device 240. The lead tap 250 may be formed of, for example, Ni, Ni-plated Al, Ni-plated Cu, Ni-plated Fe, or the like, but is not limited thereto.

The lead tap 250 may be electrically connected to a protection circuit module (not shown) for controlling over-charging or over-discharging of the electrode assembly 120. The lead tap 250 may be formed to extend along the upper surface of the extension part 236, thereby stably contacting the protection circuit module.

Although not shown, a metal layer formed of a material different from the lead tap 250 may further be located (e.g., formed) between the lead tap 250 and the temperature protection device 240. For example, the metal layer may be formed of Cu. If the metal layer formed of Cu is formed, a resistance decreases, and welding performance increases, and accordingly, it is easy to attach the lead tap 250 and the temperature protection device 240 to each other, thereby decreasing a resistance.

Referring back to FIG. 1, the insulation plate 130 may be interposed between the electrode assembly 120 and the cap assembly 200.

The insulation plate 130 may include a flat plate region 131 and a surrounding region 132 extending in an upper direction by a suitable (e.g., a predetermined) length along the periphery (e.g., circumference) of the flat plate region 131.

The flat plate region 131 may include a first incision part 133 (formed to pass the anode tap 121 therethrough) and a second incision part 134 (formed to pass the cathode tap 122 therethrough). In addition, the flat plate region 131 may include a second electrolyte injection hole 135 separated from the first incision part 133 and the second incision part 134.

The insulation plate 130 may restrain up- and down-movements of the electrode assembly 120. In particular, since the surrounding region 132 of the insulation plate 130 separates the electrode assembly 120 from the cap assembly 200 by a suitable (or predetermined) distance, the up- and down-movements of the electrode assembly 120 may be effectively prevented.

FIGS. 4 to 7 illustrate a process of manufacturing the cap assembly 200 of the battery pack 10 of FIG. 1 according to an embodiment of the present invention.

The process of manufacturing the cap assembly 200 will now be described with reference to FIGS. 2 and 3, in addition to FIGS. 4 to 7.

Figure 4:
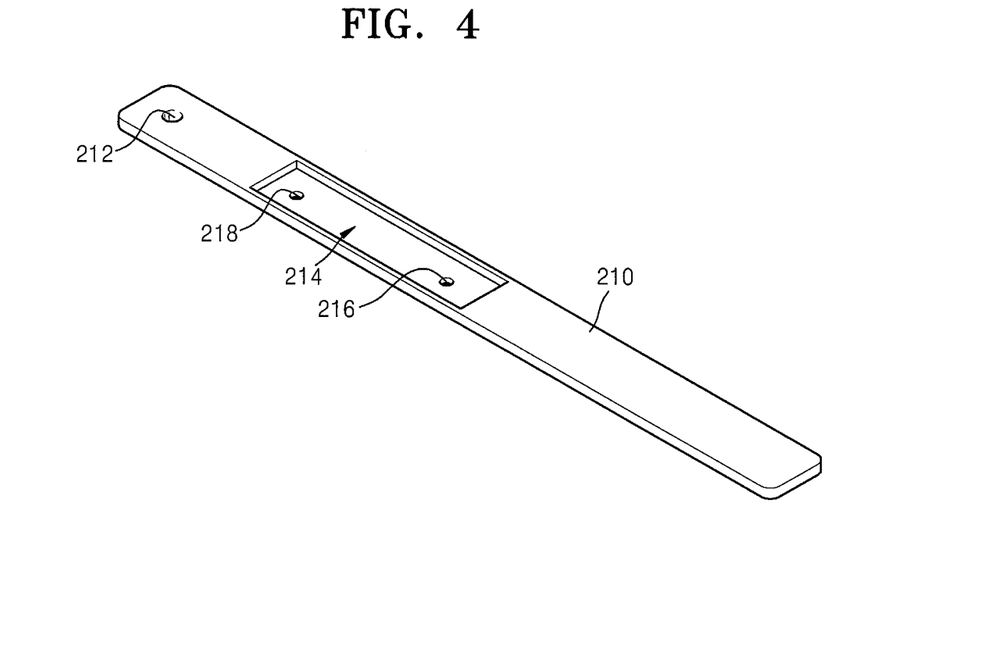
FIGS. 4 to 7 illustrate a process of manufacturing the cap assembly of the battery pack of FIG. 1 according to an embodiment of the present invention.

First, as shown in FIG. 4, the cap plate 210 is processed. The cap plate 210 may be formed of, for example, Al, and may be formed by a pressing or casting process. The cap plate 210 may include the flat first surface and the second surface opposite to the first surface, wherein the mounting groove 214 (in which the first hole 216 and the second hole 218 are formed) is formed on the first surface.

The electrolyte injection hole 212 is formed at one side of the cap plate 210. The electrolyte injection hole 212 may be sealed up thereafter (e.g., after filing the can 100 with an electrolyte) by the stopper 140.

Figure 5A:
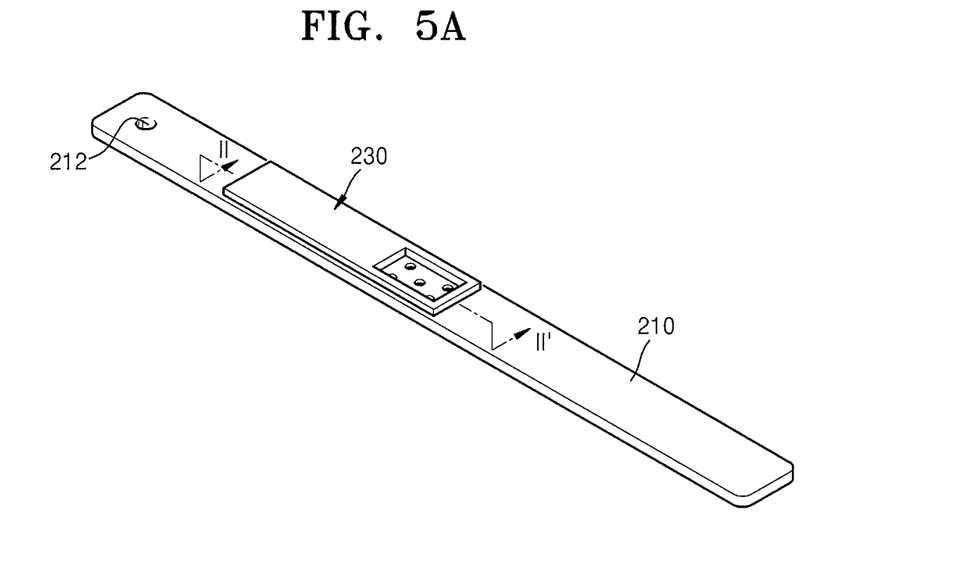
Figure 5B:
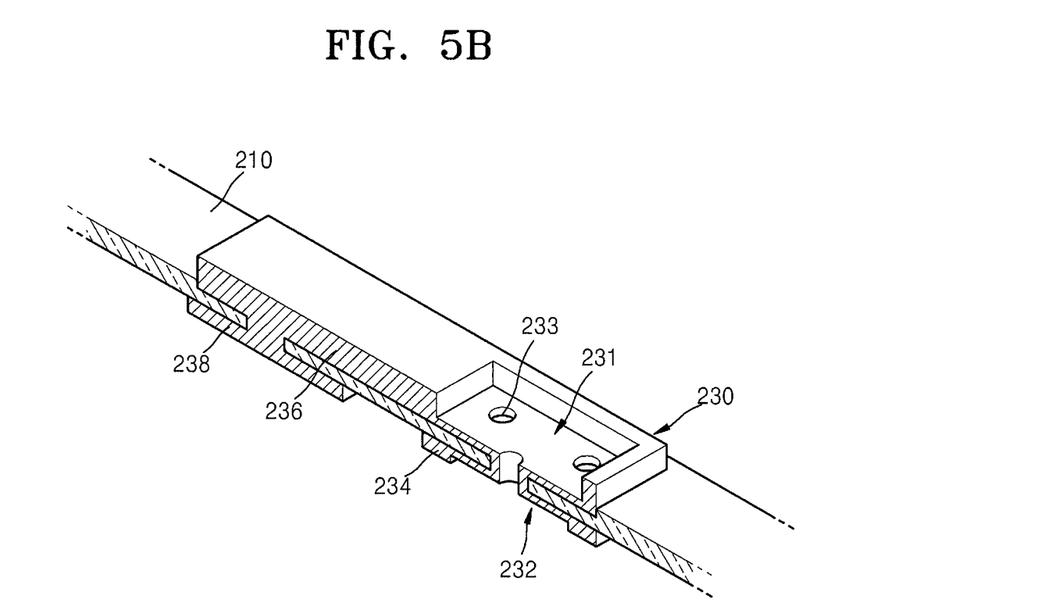

Next, as shown in FIGS. 5A and 5B, the insulation part 230 is formed. FIG. 5B is a cross-sectional view through the line II-II' of FIG. 5A.

The insulation part 230 may be formed by performing insert injection molding with the cap plate 210. In more detail, the insulation part 230 may be formed by placing a mold frame at the upper part and the lower part of the cap plate 210 and injecting a molding resin for forming the insulation part 230 into the mold frame.

The molding resin may be PVC, PS, PP, PAM, PC, PAR, PI, a fluorine resin, an epoxy resin, or the like.

According to one or more embodiments of the present invention, the formed insulation part 230 includes the first fixing part 234, the second fixing part 238, and the extension part 236, as shown in FIG. 5B. Here, the first fixing part 234 and the second fixing part 238 are formed as one body with the extension part 236 through the first hole 216 and the second hole 218. That is, the insulation part 230 may be effectively fixed to the cap plate 210 by the first and second fixing parts 234 and 236, which are formed as one body.

In addition, the insulation part 230 is located at the mounting groove 214 of the cap plate 210, thereby fixing the insulation part 230 and reducing a height of the cap assembly 200.

The first groove 231 is formed on one side of the extension part 236, and the second groove 232 is formed on the first fixing part 234. In addition, the plurality of holes 233 is formed on the bottom of the first groove 231. One of the holes 233 which may have the same center as the first hole 216 formed in the cap plate 210 and may have a smaller diameter than the first hole 216. That is, a portion of the insulation part 230 is formed at the inside surface of the first hole 216. The remaining holes 233 are formed to expose the surface of the cap plate 210 to the outside.

Figure 6A:
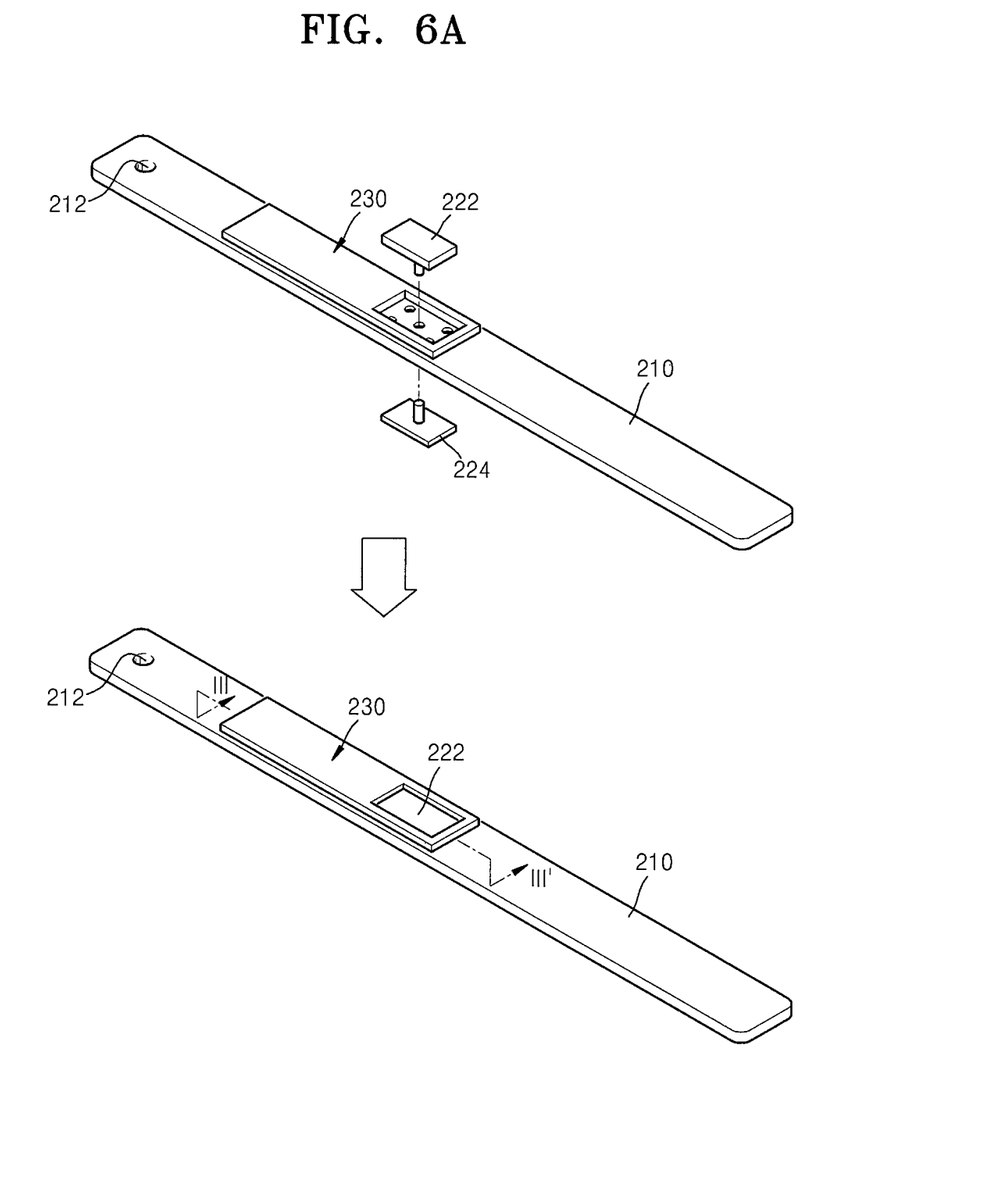
Figure 6B:
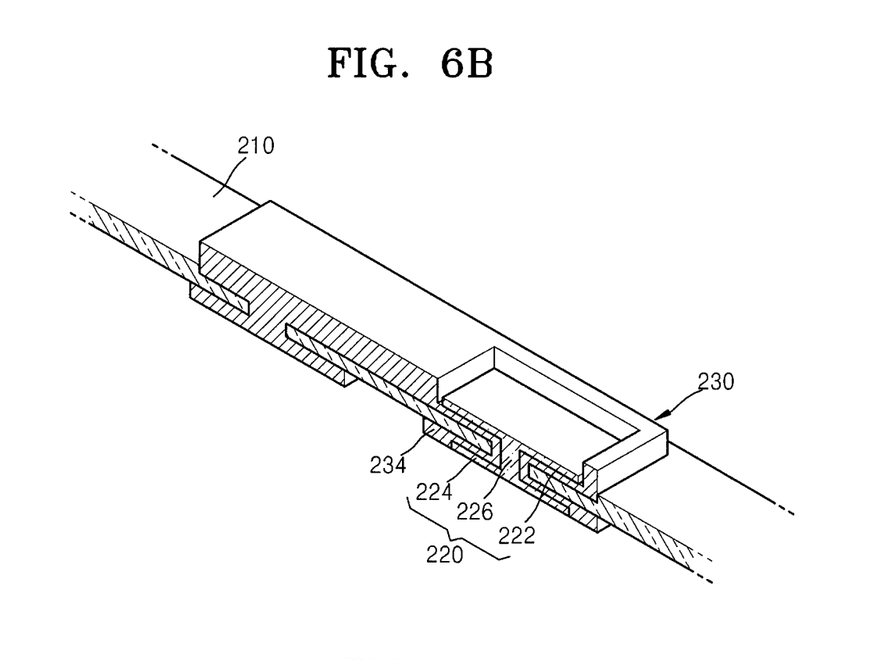

Next, as shown in FIGS. 6A and 6B, the first electrode terminal 220 is formed. FIG. 6B is a cross-sectional view through the line III-III' of FIG. 6A.

As shown in FIG. 6A, after the upper terminal 222 is inserted into the first groove 231, the lower terminal 224 is inserted into the second groove 232. The connection part 226 is attached to a portion of the upper and lower terminals 222 and 224 and is inserted into the first hole 216, the insulation part 230 being formed on the inside surface thereof (i.e., a portion of the connection part 226 is arranged in the first hole 216 with a portion of the insulation part 230 interposed therebetween).

The upper terminal 222 and the lower terminal 224 are inserted into the first groove 231 and the second groove 232, respectively, and may be forged. By doing so, the upper terminal 222 and the lower terminal 224 may be firmly assembled with the first groove 231 and the second groove 232, respectively, and the connection part 226 may form an electrical path. Since each of the formed upper and lower terminals 222 and 224 has a larger cross-sectional area than the first hole 216, the upper and lower terminals 222 and 224 prevent the first electrode terminal 220 from coming out upwards and downwards, respectively.

Figure 7:
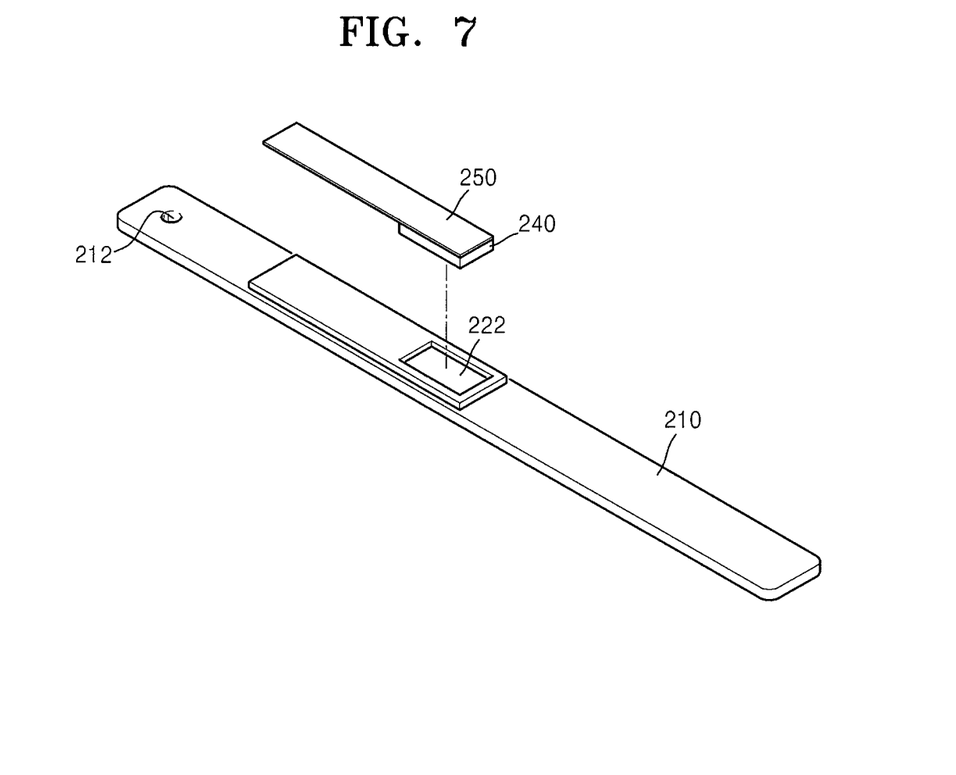

Furthermore, as shown in FIG. 7, the temperature protection device 240 is attached to the upper surface of the upper terminal 222. The lead tap 250 is attached to the upper surface of the upper terminal 222. The temperature protection device 240 may be attached to the upper terminal 222 in a state where the temperature protection device 240 is attached to the lead tap 250 as shown in FIG. 7.

The temperature protection device 240 is arranged (or accommodated) together with the upper terminal 222 in the first groove 231. Accordingly, since the temperature protection device 240 is formed in the cap assembly 200 as one body, an additional space for installing the temperature protection device 240 is not used, and a height of the cap assembly 200 is reduced, thereby having a compact structure.

In addition, as described above, since the plurality of holes 233 for exposing the surface of the cap plate 210 are formed below the first groove 231, heat (which may accompany a charging and discharging operation of the electrode assembly 120) is efficiently delivered to the temperature protection device 240 without being blocked by the insulation part 230, thereby increasing a response speed of the temperature protection device 240.

Since the cap assembly 200 formed as described above may be simply inserted into the opening 102 of the can 100 to manufacture the battery pack 10, a structure of the battery pack 10 may be compact, and a process of manufacturing the battery pack 10 may be simplified.

As described above, according to the one or more of the above embodiments of the present invention, since a temperature protection device is formed in a cap assembly as one body, a battery pack may be compact.

In addition, a process of manufacturing the battery pack may be simplified.

It should be understood that the exemplary embodiments described herein should be considered in a descriptive sense only and not for purposes of limitation. Descriptions of features or aspects within each embodiment should be considered as available for other similar features or aspects in other embodiments. It will be understood by those of ordinary skill in the art that various changes in form and details may be made to the described embodiments without departing from the spirit and scope of the present invention as defined by the appended claims and equivalents thereof.

What is claimed is:

1. A cap assembly comprising:
a cap plate comprising:
  a first surface; and
  a second surface opposite to the first surface,
  wherein a first hole penetrates through the cap plate from the first surface to the second surface;
a first electrode terminal comprising:
  an upper terminal on the first surface of the cap plate;
  a lower terminal on the second surface of the cap plate; and
  a connection part that connects the upper terminal to the lower terminal through the first hole;
a temperature protection device on an upper surface of the upper terminal;
an insulation part interposed between the cap plate and the first electrode terminal and comprising a first groove and an extension part extending along the first surface of the cap plate in a longitudinal direction of the cap plate; and
a lead tap connected to an upper surface of the temperature protection device and extending along an upper surface of the extension part,
wherein the upper terminal and the temperature protection device are in the first groove, and
wherein a thickness of the upper terminal perpendicular to the first surface is less than a depth of the first groove.

2. The cap assembly of claim 1,
wherein an area of each of the upper terminal and the lower terminal is greater than a horizontal cross-sectional area of the first hole.

3. The cap assembly of claim 1,
wherein the insulation part comprises a first fixing part on the second surface of the cap plate, the first fixing part comprising a second groove, and
wherein the lower terminal is in the second groove.

4. The cap assembly of claim 3,
wherein the cap plate has a second hole separate from the first hole,
wherein the insulation part comprises a second fixing part on the second surface of the cap plate, the second fixing part being spaced apart from the first fixing part, and
wherein the second fixing part and the extension part are continuously formed through the second hole.

5. The cap assembly of claim 1,
wherein a metal layer of a material different from the lead tap is interposed between the temperature protection device and the lead tap.

6. The cap assembly of claim 1,
wherein a plurality of third holes are in the insulation part between the cap plate and the upper terminal.

7. A battery pack comprising:
a can having an opening;
an electrode assembly inside the can; and
a cap assembly closing the opening, the cap assembly comprising:
  a cap plate comprising:
    a first surface; and
    a second surface opposite to the first surface,
    wherein a first hole penetrates through the cap plate from the first surface to the second surface;
  a first electrode terminal comprising:
    an upper terminal on the first surface of the cap plate;
    a lower terminal on the second surface of the cap plate; and
    a connection part that connects the upper terminal to the lower terminal through the first hole;
  a temperature protection device on an upper surface of the upper terminal;
  an insulation part interposed between the cap plate and the first electrode terminal and comprising a first groove and an extension part extending along the first surface of the cap plate in a longitudinal direction of the cap plate; and
  a lead tap connected to an upper surface of the temperature protection device and extending along the upper surface of the extension part,
wherein the upper terminal and the temperature protection device are in the first groove, and
wherein a thickness of the upper terminal perpendicular to the first surface is less than a depth of the first groove.

8. The battery pack of claim 7,
wherein the second surface of the cap plate faces towards the inside of the can.

9. The battery pack of claim 7,
wherein the insulation part comprises a first fixing part on the second surface of the cap plate, the first fixing part comprising a second groove, and
wherein the lower terminal is in the second groove.

10. The battery pack of claim 9,
wherein the cap plate has a second hole separate from the first hole,
wherein the insulation part comprises a second fixing part on the second surface, the second fixing part being spaced apart from the first fixing part, and
wherein the second fixing part and the extension part are continuously formed through the second hole.

11. The battery pack of claim 7,
wherein a mounting groove, on which the insulation part is mounted, is in the first surface of the cap plate.

12. The battery pack of claim 7,
wherein a metal layer of a material different from the lead tap is interposed between the temperature protection device and the lead tap.

13. The battery pack of claim 7,
wherein a plurality of third holes are in the insulation part between the cap plate and the upper terminal.

14. The battery pack of claim 7,
wherein the electrode assembly comprises an anode tap and a cathode tap, and
wherein the anode tap is electrically connected to the cap plate, and the cathode tap is electrically connected to the lower terminal.

15. The battery pack of claim 7,
wherein an insulation plate is interposed between the electrode assembly and the cap assembly.

* * * * *